United States Patent
Casey et al.

(10) Patent No.: US 6,362,967 B1
(45) Date of Patent: Mar. 26, 2002

(54) TELEPHONE LINE SURGE PROTECTOR

(75) Inventors: Kelly C. Casey, Flower Mound; Dennis M. McCoy, Dallas; Darren Daugherty, Irving, all of TX (US)

(73) Assignee: Teccor Electronics, LP, Irving, TX (US)

( * ) Notice: Subject to any disclaimer, the term of this patent is extended or adjusted under 35 U.S.C. 154(b) by 0 days.

(21) Appl. No.: 09/552,817

(22) Filed: Apr. 20, 2000

Related U.S. Application Data

(63) Continuation of application No. 09/036,559, filed on Mar. 9, 1998, now Pat. No. 6,084,761.

(51) Int. Cl.[7] .................................................. H05K 1/14
(52) U.S. Cl. ........................ 361/736; 361/719; 361/720
(58) Field of Search ............................... 361/118, 119, 361/117, 111, 124, 103–104, 54, 56, 57, 748, 736, 730, 764, 719, 720, 729, 760, 761, 714; 337/32, 31; 379/412, 437, 399

(56) References Cited

U.S. PATENT DOCUMENTS

| | | | | |
|---|---|---|---|---|
| 3,975,664 A | * | 8/1976 | Baumbach | 317/66 |
| 4,796,150 A | | 1/1989 | Dickey et al. | 361/119 |
| 4,876,621 A | | 10/1989 | Rust et al. | 361/58 |
| 4,901,188 A | | 2/1990 | Gilberts | 361/119 |
| 4,907,120 A | * | 3/1990 | Kaczmarek et al. | 361/119 |
| 4,944,003 A | | 7/1990 | Meyerhoefer et al. | 379/412 |
| 4,958,253 A | * | 9/1990 | Gilberts et al. | 361/119 |
| 4,958,254 A | | 9/1990 | Kidd et al. | 361/119 |
| 4,964,160 A | | 10/1990 | Traube et al. | 379/412 |
| 5,031,067 A | * | 7/1991 | Kidd et al. | 361/119 |
| 5,155,649 A | | 10/1992 | Hung et al. | 361/119 |
| 5,166,855 A | | 11/1992 | Turner | 361/119 |
| 5,172,296 A | | 12/1992 | Kaczmarek | 361/119 |
| 5,175,662 A | * | 12/1992 | DeBalko et al. | 361/119 |
| 5,191,605 A | | 3/1993 | Brower | 379/332 |
| 5,224,012 A | | 6/1993 | Smith | 361/119 |
| 5,327,318 A | | 7/1994 | Popat et al. | 361/55 |
| 5,334,553 A | | 8/1994 | Popat et al. | 437/209 |
| 5,357,568 A | * | 10/1994 | Pelegris | 361/119 |
| 5,371,647 A | | 12/1994 | Fried et al. | 361/119 |
| 5,384,679 A | | 1/1995 | Smith | 361/119 |
| 5,398,152 A | * | 3/1995 | Borkowicz | 361/119 |
| 5,438,619 A | * | 8/1995 | Shannon | 379/412 |
| 5,442,519 A | | 8/1995 | DeBalko et al. | 361/784 |
| 5,488,535 A | | 1/1996 | Masghati et al. | 361/119 |
| 5,523,916 A | * | 6/1996 | Kaczmarek | 361/119 |
| 5,541,804 A | | 7/1996 | Frekeriksen | 361/119 |
| 5,561,582 A | | 10/1996 | Geishecker et al. | 361/118 |
| 5,646,812 A | | 7/1997 | Hernandez, Jr. | 361/124 |
| 6,034,862 A | | 3/2000 | Pelosi et al. | 361/119 |

OTHER PUBLICATIONS

Advertisement for Surge Protection Modules 3 Element Gas—Premium Series, Circa Telecom, 1996 No month.
One Physical Surge Protection Module by CIRCA Telecom, Model CT3B1S no date.

* cited by examiner

*Primary Examiner*—Jeffrey Gaffin
*Assistant Examiner*—Hung Bui
(74) *Attorney, Agent, or Firm*—Howlson, Chauza, Thoma, Handley & Arnott, LLP; Roger N. Chauza

(57) ABSTRACT

A telephone line protection module having a printed circuit board base with conductive paths connected to pins of the module. Overvoltage sensitive semiconductor devices are soldered to the ends of a conductive bridge, and the bridge is spring-biased between a module cover and the conductive bridge. The semiconductor devices are thus forced into electrical contact with the printed circuit paths. In addition, in the event the semiconductor devices are thermally destroyed, the conductive bridge is forced by the spring into direct contact with the printed circuit paths.

25 Claims, 5 Drawing Sheets

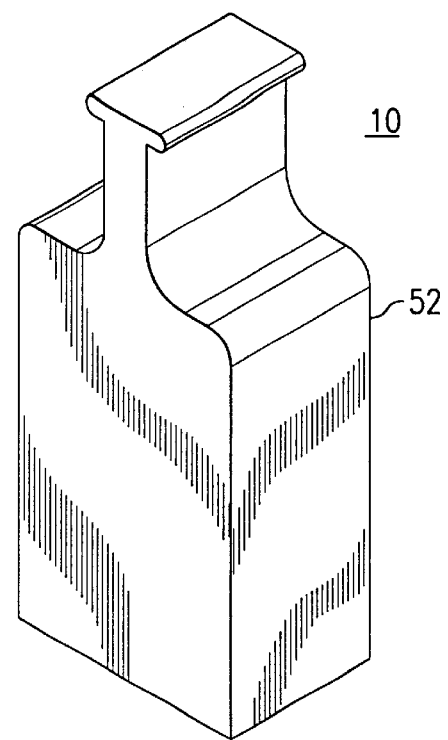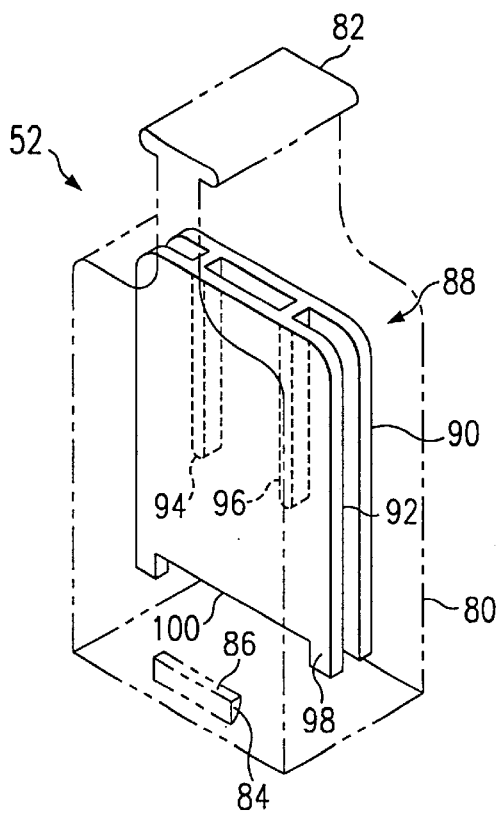
FIG. 4
FIG. 1

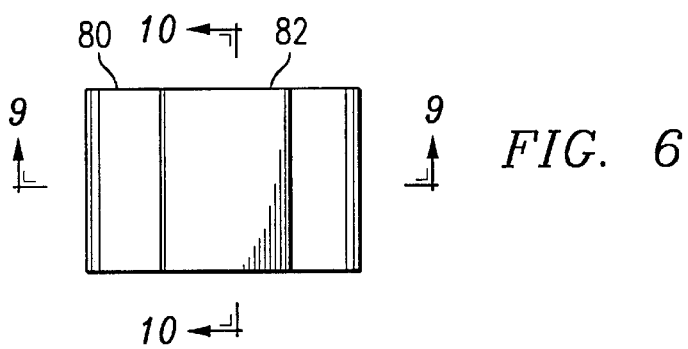
FIG. 6
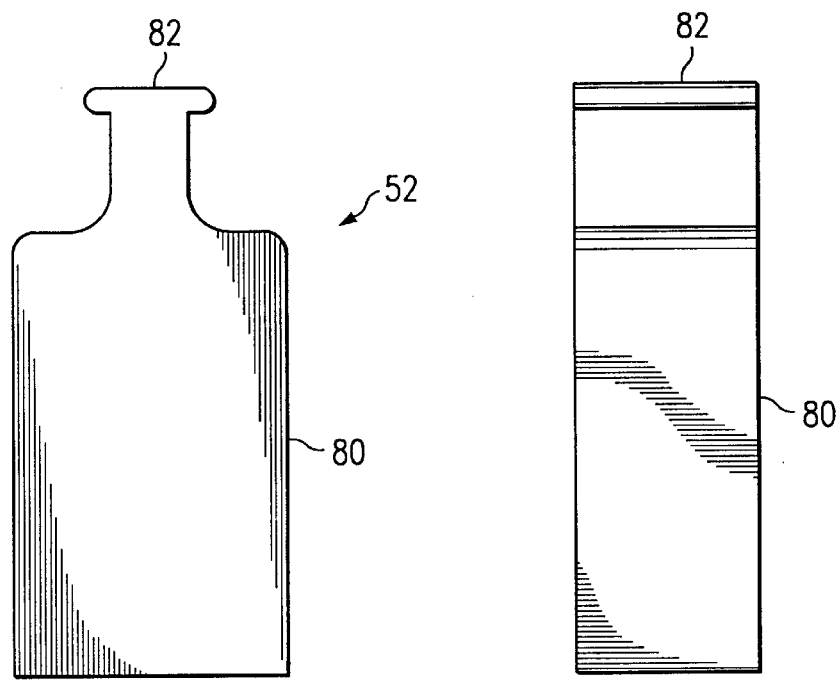
FIG. 5
FIG. 8
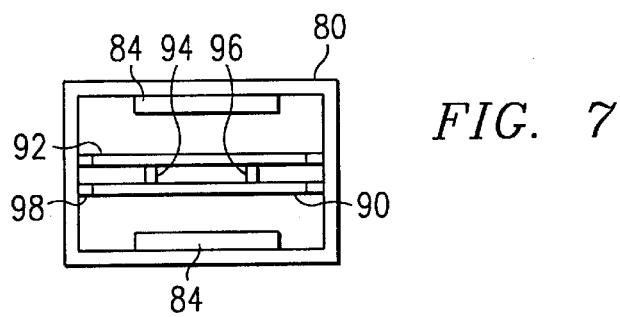
FIG. 7

TELEPHONE LINE SURGE PROTECTOR

CROSS-REFERENCE TO RELATED APPLICATION

This is a continuation of U.S. patent application Ser. No. 09/036,559, filed Mar. 9, 1998, now U.S. Pat. No. 6,084,761 the entire subject matter of which is incorporated herein by reference.

TECHNICAL FIELD OF THE INVENTION

The present invention relates in general to electrical modules providing protection to telephone lines, and more particularly to an economical 5-pin protector that facilitates the manufacture and assembly thereof.

BACKGROUND OF THE INVENTION

Telephone line protection devices have been required for many years by telephone operating companies, and the like, in order to provide protection to central office switching equipment from electrical strikes and power line crosses coupled to the telephone lines. At least one telephone line protector is required for each telephone subscriber line. In view that many central office switching systems service thousands, and often hundreds of thousands of subscribers, many such protection modules are required. Each module is constructed of a standardized size and with five pins of a uniform configuration. Two pins are associated with the tip and ring telephone lines, two other pins are associated with the customer or equipment tip and ring lines, and a fifth pin is connected to ground.

The basic function of a telephone line surge protection circuit is to sense an excessive voltage, such as 300 volts, on either the telephone line tip or ring conductor, and very quickly connect such conductor to ground to prevent the customer equipment from experiencing sustained voltages higher than such threshold. Specialized solid state devices are generally utilized for providing a high speed short circuit to ground. A host of other subsidiary features can be carried out by the protection device, including fail-safe grounding in response to a thermal overload, open circuiting between the telephone line and customer lines, etc.

Because of the high demand for protection devices, a myriad of such devices are currently available. Illustrative of the many different protection device designs and modules are those set forth in U.S. Pat. No. 4,796,150 by Dickey et al.; U.S. Pat. No. 5,031,067 by Kidd et al; U.S. Pat. No. 5,172,296 by Kaczmarek; and U.S. Pat. No. 5,357,568 by Pelegris. In all of these protection module designs, there are many complicated parts which lead not only to greater cost, but also to reduced reliability. Importantly, because of the complicated nature of the components of the various modules, the manual labor in assembling the modules is extensive, which only leads to a more costly product.

It is well-known in the electronics industry to facilitate assembly of modules by mounting the components on printed circuit boards. Indeed, the printed circuit board manufacture as well as the automatic component insertion is well-established. The use of printed circuit boards in protection devices is suggested in U.S. Pat. No. 5,175,662 by DeBalko et al. Various semiconductor devices and components are mounted on a printed circuit board which, in turn, is connected by connector contacts to a module base. Although this design tends to be more efficient, it still requires the additional expense of connectorizing the printed circuit board as well as requires a molded plastic base for the module. The injection molding of the base members of many of the protection modules is a standard practice, as noted in U.S. Pat. No. 5,357,568 by Pelegris. Disclosed in U.S. Pat. No. 5,442,519, also by DeBalko et al, is a pair of printed circuit boards that are utilized in a telephone line protection module. However, one printed circuit board is still connected to a plastic base member by way of pin and socket connectors, thereby resulting in a relatively expensive unit. The use of plastic base members is popular, primarily because of the ease of forming tabs at the peripheral edges thereof for snap-lock engagement with corresponding holes in a protective cover. Such an arrangement is shown in the Dickey et al. patent identified above.

In many of the conventional telephone line protection modules, encapsulated semiconductor devices are utilized as overvoltage sensors and switches. The reason for this is that such devices are generally available from the manufacturer only in packaged or encapsulated form. Again, the additional processing of the devices to package the same results in a more expensive component, often when packaged devices are not necessary. For example, when a semiconductor device is packaged so as to have pins, then often a corresponding socket is required. It can be appreciated that the use of packaged components often leads to a more expensive product.

From the foregoing, it can be seen that a need exists for a new type of protection module that has few components, is easily assembled and is much less costly than the prior art modules. Another need exists for an improved telephone line protection module that employs a printed circuit board as the base itself to which the module pins are inserted, thereby facilitating both manufacture, assembly and cost. Another need exists for a protection module design in which the protective cover can be snap-lock engaged directly to a printed circuit board base member.

SUMMARY OF THE INVENTION

In accordance with the principles and concepts of the invention, a protection module is disclosed of the type that overcomes the shortcomings and problems attendant with the prior art designs. In accordance with the preferred embodiment of the invention, the telephone line protection module includes a printed circuit board base member to which five module pins are mounted. The printed circuit board is formed with three general conductive areas, two for connecting the respective telephone line tip and ring conductors to the corresponding tip and ring customer equipment, and a third conductive path providing a ground connection to the module circuits.

First and second unpackaged semiconductor wafer devices that are responsive to overvoltage conditions are soldered to a conductive bridge member. The center of the bridge member is then soldered to the printed circuit board ground connection, while the ends of the bridge member cause the semiconductor wafers to be forced into electrical contact with respective printed circuit board tip and ring conductive paths. A generally C-shaped spring with curved ends is captured within web structures of a housing cover so that when the cover is snap-fit to the printed circuit board base, the spring wire bears down on the ends of the conductive bridge, thereby forcing the semiconductor wafer devices into contact with the respective tip and ring conductive paths. A fail-safe mechanism is provided, in that if either one of the semiconductor wafers is thermally destroyed due to excessive current therethrough, the spring tension causes the conductive bridge to be forced into contact directly with the conductive path of the printed circuit board. A telephone line protection module of very few components, and which is easily assembled, is thereby provided.

In accordance with a second embodiment of the invention, the module case does not snap-lock to the printed circuit board base, but rather has a housing cover with a plastic post that protrudes through the base. The end of the post can thus be melted and mushroomed to thereby secure the base to the module cover.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or functions throughout the views, and in which:

FIG. 1 is an exploded view of the various components of the telephone line protection module constructed according to the invention;

FIG. 4 is an isometric view of the module cover shown in broken lines, and with the internal webbing structure shown in solid lines for holding the C-shaped spring;

FIGS. 5–8 are respective first side, top, bottom and second side views of the module cover constructed according to the invention;

DETAILED DESCRIPTION OF THE INVENTION

Figure 2:
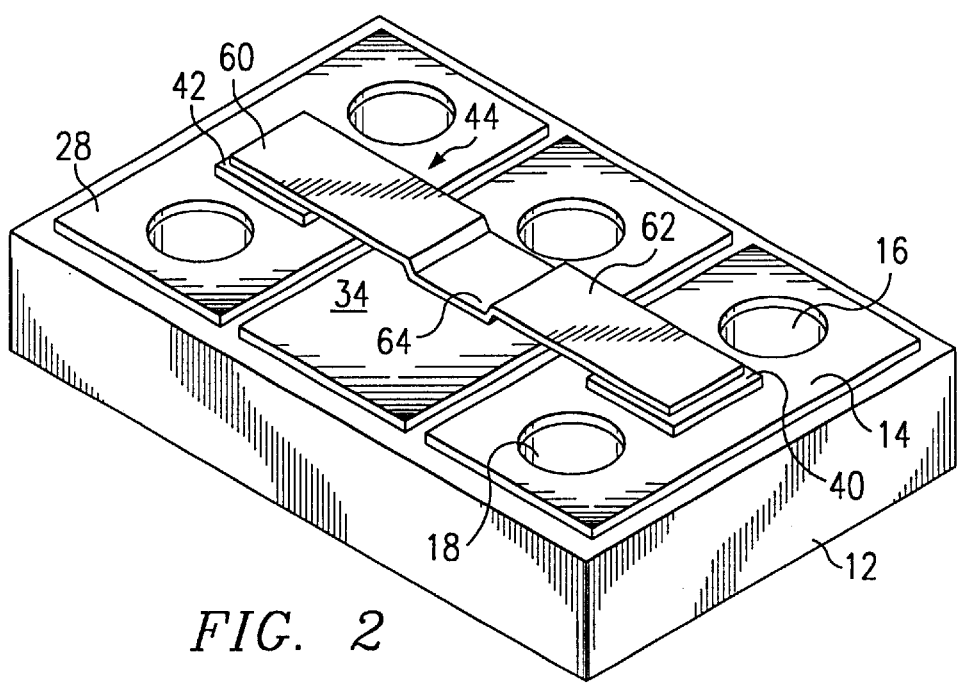
FIG. 2 is an isometric view of the printed circuit board base member, together with the semiconductor devices and the conductive bridge member.

FIG. 1 illustrates the various components of the telephone line protection device 10 constructed according to a first embodiment. According to an important feature, a base member 12 comprises a printed circuit board having a first conductive path 14. A first bore 16 and a second bore 18 are formed through the printed circuit board 12, as well as through the conductive path 14. A pair of pins 20 and 22 associated with the telephone line ring conductor and the customer ring conductor, each include a reduced diameter shank, such as shown by reference numeral 24. The reduced diameter portion 24 of the pin 22 fits within the respective bore 18 until stopped by the shoulder 26. The pin 22 can then be soldered to the conductive path 14. The other pin 20 is similarly secured and supported by the printed circuit board base 12. A second conductive path 28 is associated with a pair of pins 30 and 32, each associated with the telephone tip and customer tip lines. The pins 30 and 32 are supported and electrically connected to the base 12 in the manner described above. Lastly, a third conductive path 34 is formed between the ring conductive path 14 and the tip conductive path 28. A ground pin 36 fits within a bore 38 and is electrically connected to the path 34 in the manner described above. As can be appreciated, the spacing, arrangement and length of the various pins is standardized and well-known in the art.

A first semiconductor device 40 and a second semiconductor device 42 are placed into electrical contact with the respective ring conductive path 14 and tip conductive path 28. As will be described more thoroughly below, the semiconductor devices 40 and 42 conduct current in a bidirectional manner, and need not be packaged or encapsulated. Rather, the devices need only be "bare" semiconductor wafers having suitable contact surfaces on opposing sides thereof. Preferably, each semiconductor device 40 and 42 comprises a SIDACtor® that allows a bidirectional flow of current therethrough when a threshold voltage has been exceeded. General purpose SIDACtor devices are disclosed in U.S. Pat. No. 5,479,031, assigned to the assignee hereof.

A respective end of a conductive bridge member 44 is soldered to a top contact of each semiconductor device 40 and 42 so as to sandwich the devices between the bridge member 44 and the respective printed circuit board conductive paths 14 and 28.

A C-shaped spring 46 having curved ends 48 and 50 applies downward pressure on the opposing ends of the bridge member 44 to thereby force the semiconductor devices 40 and 42 into intimate contact with the respective conductive paths 14 and 28.

A module housing 52 molded with a plastic material is constructed to achieve a snap-lock engagement with the printed circuit board base 12. As will be described more thoroughly below, the housing 52 is constructed internally to hold the spring 46 so that uniform pressure can be applied to the semiconductor devices 40 and 42 via the bridge member 44.

With reference now to FIG. 2, there is shown an enlarged view of the base member of a portion of the telephone line protector module 10. The printed circuit board 12 is of conventional design, constructed of an epoxy and fiberglass composition. Other suitable materials on which printed circuit conductive paths can be formed can be employed in the fabrication of the invention. Preferably, the printed circuit board base 12 is about 0.0625 inches thick. Etched or otherwise formed on the surface of the printed circuit board 12 are the three conductive areas 14, 28 and 34. The conductive areas are preferably formed of a heavy copper material sufficient to carry the requisite current. After the module pins are inserted into the holes and held therein, the base can be processed through a reflow solder machine so that the pins are soldered to the respective conductive paths. Ideally, although not a necessity, a surface area in the middle of the conductive paths 14 and 28 can be plated with a nonoxidizing conductive material, such as gold, and thereafter masked to prevent solder flow thereon. Such isolated conductive paths provide an excellent contact to the respective bottom contact area of the semiconductor devices 40 and 42.

As noted above, each semiconductor device 40 and 42 is preferably a triac-like device, in which current can be carried in either direction. In other words, each semiconductor device can conduct current therethrough, irrespective of the polarity of the overvoltage coupled to the telephone line. Also, in order to make the module 10 further cost-effective, the semiconductor devices 40 and 42 need not be packaged or encapsulated, but need only have suitable contacts on both top and bottom surfaces thereof. Semiconductor devices having breakdown voltages of about 275–350 volts, and which can carry currents ranging upwardly of 100 amps at a 10×1000 microsecond waveform, are obtainable from Teccor Electronics, Inc., Irving, Tex.

The conductive bridge 44 is preferably constructed of a strip of copper having two ends 60 and 62 connected by an intermediate offset section 64. The extent by which the section 64 is offset with regard to the ends 60 and 62 is substantially the same as the thickness of the semiconductor devices 40 and 42. This allows the bottom surface of the offset section 64 to be soldered to the ground conductive area 34 without placing the bridge member 44 in tension or stress. The conductive bridge 44 is constructed of a copper material of the requisite cross-sectional area so as to conduct a sufficient amount of current. While only one conductive bridge 44 is utilized, those skilled in the art may prefer to utilize a separate conductive bridge to connect the semiconductor devices 40 and 42 to a ground path.

In accordance with an important feature, the top contact (not shown) of each semiconductor device 40 and 42 is soldered to the bottom surface of the respective conductive bridge arm 60 and 62. The bottom contact (not shown) of each semiconductor device 40 and 42 is not fixed to the respective conductive area 14 and 28, but only makes a pressure contact therewith. This reduces thermal stresses imparted to the semiconductor devices 40 and 42 due either to ambient temperatures or temperatures generated by current flow through either the conduction path or the device. Alternatively, the semiconductor devices 40 and 42 can be soldered to the printed circuit board conductive areas, but not to the conductive bridge 44.

Figure 3:
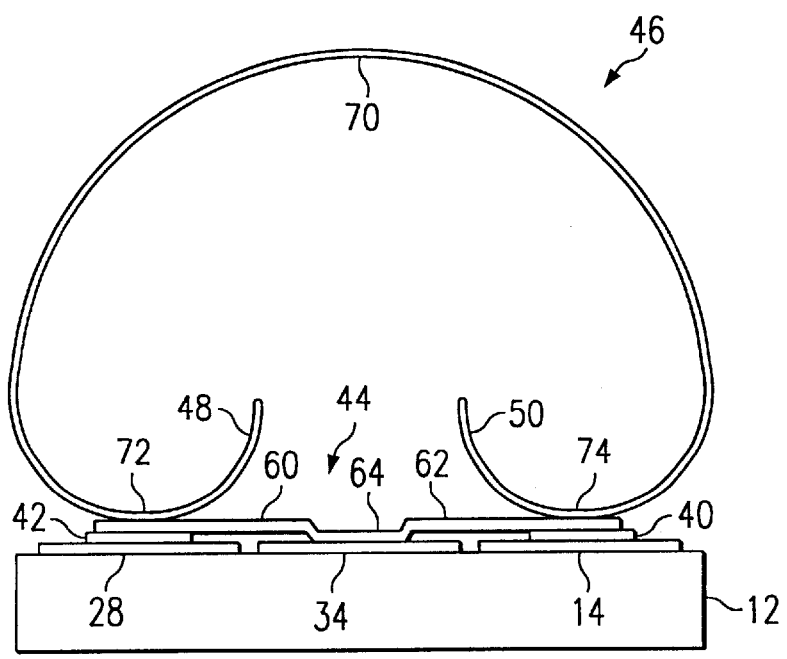
FIG. 3 is a side view of the printed circuit board base member and the relative position of a C-spring that is biased against the bridge member.
Figure 9:
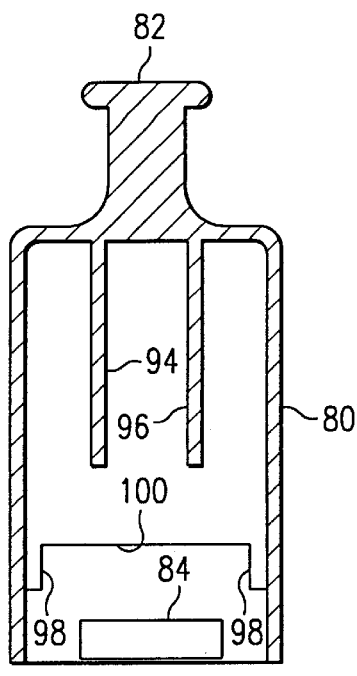
FIGS. 9 and 10 are sectional views of the module cover, taken along lines 9—9 and 10—10 of FIG. 6.
Figure 10:
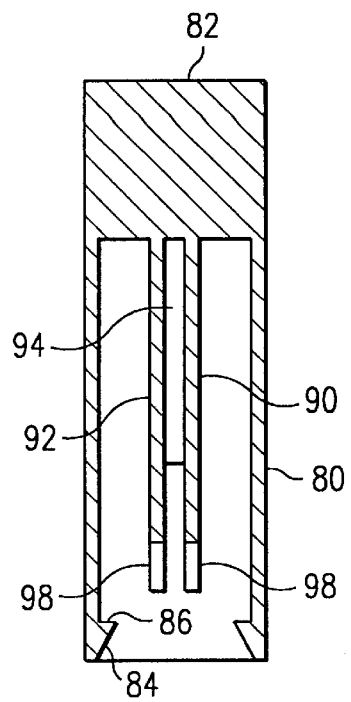

FIG. 3 illustrates the manner in which the semiconductor devices 40 and 42 are spring-biased into electrical contact with the respective conductive surfaces 14 and 28 of the printed circuit board base 12. A generally C-shape spring 46 is formed as a cross-sectionally round, flat, rectangular or square wire. A phosphor bronze or other suitable spring material can be utilized. A major portion 70 of the spring 46 is formed in a semicircular arc of a first radius. The ends 48 and 50 of the spring 46 also constitute semicircular arcs, each having a radius that is substantially smaller than the radius of the spring portion 70. Midsections 72 and 74 of the respective spring ends 48 and 50 bear down upon the respective ends 60 and 62 of the conductive bridge 44. With this arrangement, intimate contact is provided between the bottom contact of the semiconductor devices 40 and 42 and the respective printed circuit board conductive paths 14 and 28.

The spring 46 not only provides the pressure to achieve a reliable semiconductor device contact to the conductive paths 14 and 28, but also exerts a sufficient force to "crush" the semiconductor devices should thermal destruction thereof occur. Depending upon the amount of energy imparted into a telephone line by a power line cross or a lightning strike, the current carried by one or both of the semiconductor devices 40 and 42 may cause a thermal destruction thereof. In other words, the current conducted by the device can literally melt the semiconductor material. Should this type of thermal destruction occur, the force applied by the spring 46 to the semiconductor device causes the liquefied semiconductor material to disburse outwardly, thereby forcing the conductive bridge end into direct contact with the conductive path of the printed circuit board 12. When this occurs, the telephone line is maintained in a short circuit condition to ground, despite the destruction of the semiconductor device. Importantly, the fail-safe feature provided by the spring 70 is not triggered at any specific temperature thereof, but is effective only when the semiconductor material liquefies. Accordingly, no safety margin is required or needed between the fail-safe operation and the temperature at which the semiconductor material melts.

FIG. 4 illustrates the module housing 52 that is adapted for snap-locking to the printed circuit board base 12. The housing 52 includes a cover 80 that is shown for purposes of clarity in broken line. The cover 80 is preferably formed of a valox plastic, or other flameproof moldable material. The cover 80 is formed as a rectangular shell having an open bottom and a top handle 82 for easy grasping by a person's fingers. At the bottom of the cover 80, near the opening, are a pair of opposing wedge-shaped bosses, one shown as reference numeral 84. The boss 84 is formed integral on the inside surface of the cover 80, and includes a top surface 86 that is generally orthogonal to the inside surface of the cover 80. The inside dimension of the cover 80 is selected so as to receive therein, in a close fit, the rectangular-shaped printed circuit board base 12. By utilizing a pair of bosses 84, the printed circuit board base 12 can be pushed into the bottom opening of the cover 80, and past the bosses 84 so as to be snap-locked and captured within the cover 80. When in a snap-lock position, a bottom surface of the printed circuit board base 12 engages with the top surface 86 of each of the bosses 84. Removal of the printed circuit board base 12 can be achieved by using a blade slipped between the edge of the printed circuit board base 12 and the inside surface of the cover 80 and prying the bosses 84 away from the printed circuit board base 12. In this manner, the printed circuit board base 12 and associated components can be removed from the housing 52.

Formed integral within the cover portion 80 of the housing 52 is a web configuration shown in solid line and as reference numeral 88. The web structure 88 comprises a first planar web 90 and a second planar web 92 interconnected by two partial-length webs 94 and 96, both shown in broken line. As noted above, the web structure 88 is formed integral with the cover 80 as a result of an injection molding process. At the lower end of each of the planar webs 90 and 92 there is a depending stop member, one shown as reference numeral 98. The four stop members 98 function to abut the top side of the printed circuit board 12 when pushed into the open end of the cover 80. Each web 90 and 92 includes a recessed area 100 to accommodate the components, such as the conductive bridge 44 that extends above the surface of the printed circuit board 12. The details of the enclosure 52, as well as the web structure 88 are shown more thoroughly throughout the views of FIGS. 5–10. The manner in which the webs 90 and 92, as well as the connecting webs 94 and 96 hold the spring 46 in a fixed position is shown in more detail in FIGS. 11a and 11b.

Figure 11A:
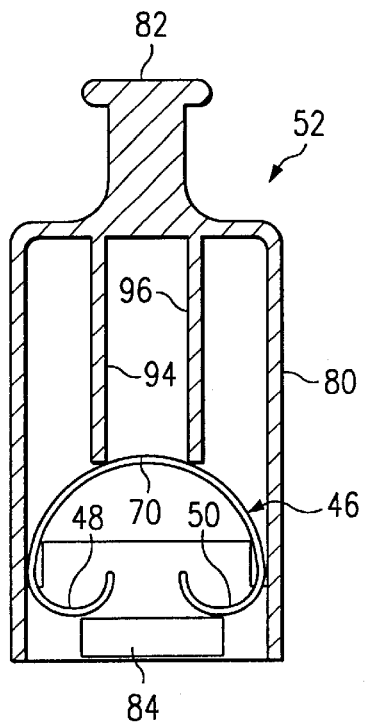
FIGS. 11a and 11b are cross-sectional views of the module cover showing the internal webbing structure for supporting the C-shaped spring.
Figure 11B:
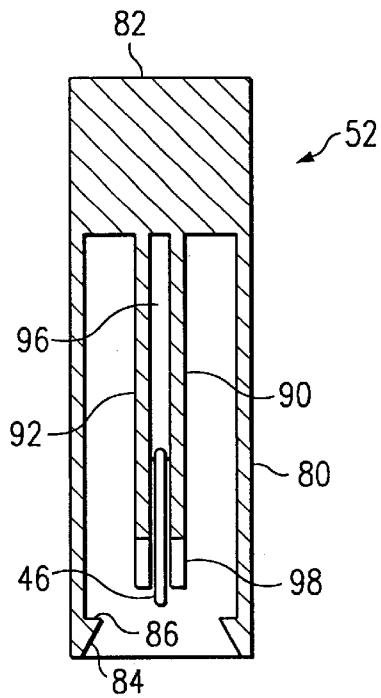

The C-shape spring 46 is held in a fixed position within the cover 80 between the planar webs 90 and 92, as well as abutted against the connecting webs 94 and 96, as shown in FIGS. 11a and 11b. The C-shape spring 46 is generally captured between the spaced-apart planar webs 90 and 92, as shown in FIG. 11b. The spring 46 loosely fits between the webs 90 and 92 so as not to interfere with the movement of the spring when the printed circuit board base and conductive bridge 44 are forced thereagainst. This lateral engagement by the spring 46 constrains it from moving laterally. In FIG. 11a, the inside opposing surfaces of the cover 80 capture the spring to prevent movement in this direction. The upper part of the spring 70 engages against the ends of the connecting webs 94 and 96 and function as a stop to prevent the spring from moving upwardly. During tensioning of the spring 46 when the conductive bridge 44 is forced in contact therewith, the semicircular ends 48 and 50 flex upwardly. In this manner the spring 46 is captured within the cover 80 and a constant pressure is applied against the bridge 44 which, in turn, maintains the semiconductor devices 40 and 42 in electrical contact with the respective conductive paths 14 and 28 of the printed circuit board 12.

Figure 12:
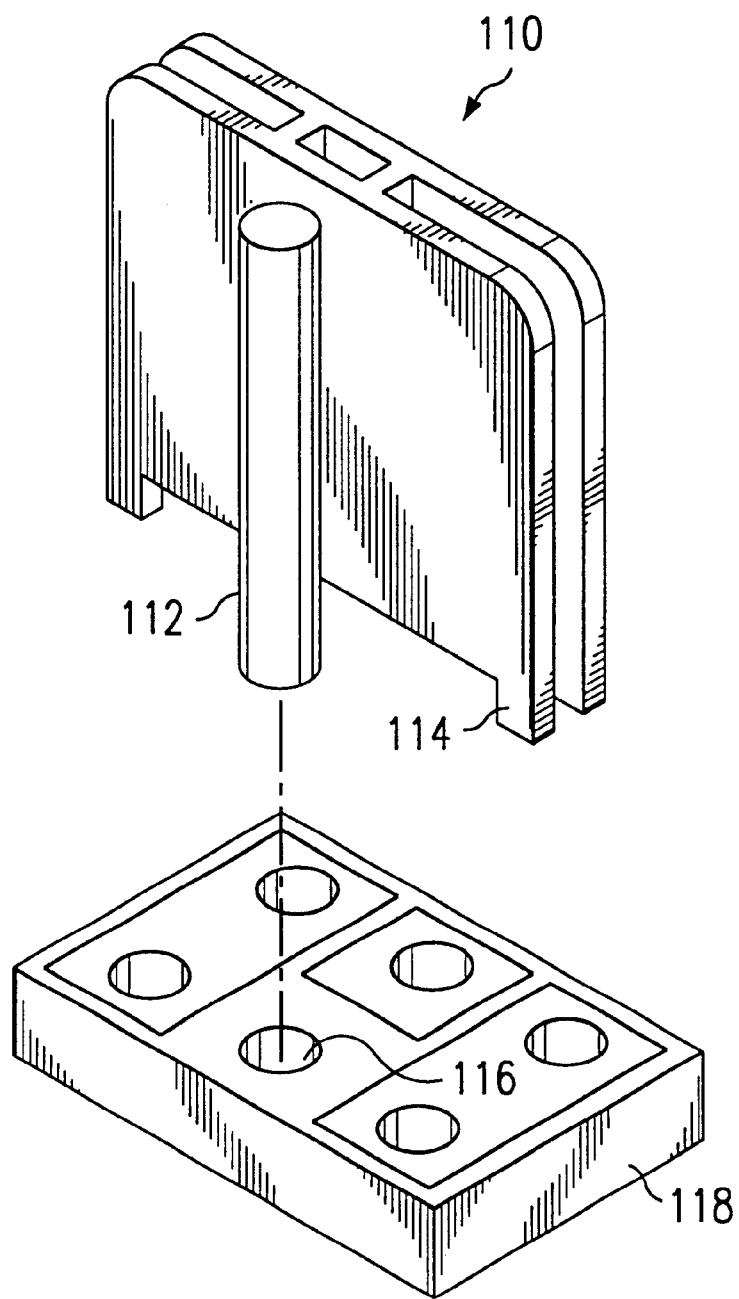
FIG. 12 illustrates another embodiment of a module cover webbing structure and base member.

In accordance with another embodiment of the invention, the cover is fastened to the base in a permanent manner. As shown in FIG. 12, there is illustrated a web structure 110, similar to that shown in connection with FIG. 4. For purposes of clarity, the cover of the module is not shown. In this embodiment, formed integral with the web structure 110 is plastic post 112 that extends below the stop members 114 a distance sufficient to protrude through a hole 116 in the printed circuit board base 118. Again, the various components mounted to the printed circuit board base 118 are not shown. The post 112 extends beyond the bottom surface of the base 118 when the latter is fully inserted into the module cover and abutted against the stops 114. Then, the bottom end of the plastic post 112 is swaged by melting, or otherwise, to flare out the end in a mushroomed manner and thereby fix the cover to the base 118.

Various modifications can be made to the embodiments described above. For example, the conductive bridge 44 could be fabricated of a spring-like material to function also as a spring to force the semiconductor devices 40 and 42 into contact with the respective conductive paths of the printed circuit board. With this arrangement, the spring conductive bridge would be fastened at its center to the printed circuit board. Depending on the material with which the spring conductive birdge is constructed, it could be soldered or screwed to the printed circuit board. Also, those skilled in the art may prefer to construct either the conductive bridge 44, or the spring conductive bridge, in separate parts, one associated with each semiconductor device.

In addition to the foregoing, the spring 46 can be made in many different shapes and configurations for engagement with the internal structure of the cover. Indeed, the spring 46 can be made as two or more individual spring components. By utilizing a spring structure that engages internally with the cover, assembly of the module is facilitated because fewer components need to be individually held in place at the same time during overall assembly.

While the preferred and other embodiments of the invention have been disclosed with reference to a specific telephone line protector device, and methods of fabrication and operation thereof, it is to be understood that many changes in detail may be made as a matter of engineering choices, without departing from the spirit and scope of the invention, as defined by the appended claims.

What is claimed is:

1. A module containing electronic components, said module having pins extending therefrom and adapted for plugging into a socket, comprising:
   a printed circuit board base for said module, said printed circuit board base including conductive paths formed thereon, said module pins being fixed in said printed circuit board base in electrical contact with respective said conductive paths;
   one or more of said electronic components fixed to respective said conductive paths so as to be electrically connected to ones of said module pins; and
   a protective cover for protecting said electronic components, said protective cover being engaged with said printed circuit board base.

2. The module of claim 1, further including a spring engaged between said protective cover and said printed circuit board base for maintaining an engagement between said protective cover and said printed circuit board base.

3. The module of claim 2, wherein said protective cover includes plural bosses formed on an inside surface thereof so that when said printed circuit board base is pushed inside said protective cover, said bosses and said spring inhibit said printed circuit board base from being removed from said protective cover.

4. The module of claim 3, wherein said protective cover is formed to register said spring so that said printed circuit board base is biased by said spring against said plural bosses.

5. The module of claim 4, wherein said spring a comprises a C-shaped wire spring, and wherein said protective cover includes a webbed structure formed therein for registering said wire spring.

6. The module of claim 5, wherein said module is formed so that the ends of said C-shaped wire spring apply a pressure to said printed circuit board base.

7. The module of claim 6, wherein said C-shaped spring applies pressure to said printed circuit board base via an electronic component.

8. The module of claim 7, wherein said electronic component includes a semiconductor device.

9. The module of claim 8, wherein the ends of said spring apply pressure to a conductive bridge, and a pair of semiconductor devices are sandwiched between said conductive bridge and the conductive paths of said printed circuit board base.

10. A module containing electronic components, said module comprising:
    a printed circuit board base with conductive paths formed thereon, said conductive paths providing electrical connections to electronic components mounted on said printed circuit board base; and
    a protective cover for protecting said electronic components, said protective cover having an internal opening for receiving therein said printed circuit board base, said protective cover having a boss formed on internal surface thereof for engaging said printed circuit board base.

11. The module of claim 10, wherein said boss engages a peripheral edge of said printed circuit board base.

12. The module of claim 10, further including plural bosses, whereby when said printed circuit board base is pushed inside and beyond said boss, said printed circuit board base is inhibited from being removed.

13. The module of claim 12, wherein each said boss includes a beveled surface to facilitate insertion of said printed circuit board base into said protective cover.

14. The module of claim 12, further including a spring for biasing said printed circuit board against said boss.

15. The module of claim 14, wherein said spring is generally C-shaped.

16. The module of claim 14, wherein said spring also biases electronic components into contact with the conductive paths.

17. The module of claim 10, further including a spring that is structured and arranged to maintain said printed circuit board base against said boss.

18. The module of claim 17, wherein said spring biases an integrated circuit into electrical contact with a conductive path of said printed circuit board base.

19. The module of claim 18, wherein said spring biases plural integrated circuits into electrical contact with respective said conductive paths.

20. The module of claim 19, further including a bridge engaged on one side thereof by said spring, and on another side thereof by said integrated circuits.

21. The module of claim 17, wherein said protective cover holds said spring so as to apply a spring bias against said printed circuit board.

22. The module of claim 10, further including a plurality of pins extending from said printed circuit board base.

23. The module of claim 10, wherein said pins are adapted for mating with a socket into which said module is inserted.

24. The module of claim 12, wherein said protective cover further includes a stop member formed therein and spaced from said boss, whereby when said printed circuit board base is pushed beyond said boss, said printed circuit board base is captured between said boss and said stop member.

25. A module containing electrical components, comprising:

a printed circuit board base having conductive paths;

a plurality of pins anchored in said printed circuit board base and to ones of said conductive paths;

a plurality of integrated circuits, each having a top contact and a bottom contact, the bottom contact of said integrated circuits in contact with a respective conductive path;

a conductive bridge bridging the top contact of said integrated circuits;

a spring for applying a spring bias to said conductive bridge; and a protective cover engageable with said printed circuit board base, and engaged with said spring so that said spring is urged against said conductive bridge.

* * * * *